Aug. 12, 1930.  W. D. BAUMANN  1,772,699
WIRE BAKING PAN
Filed March 9, 1929
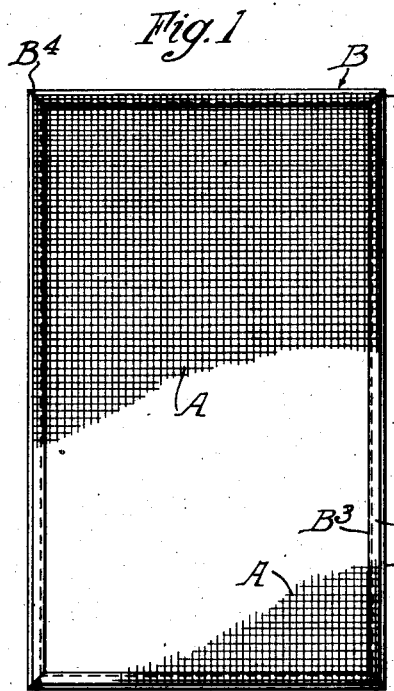
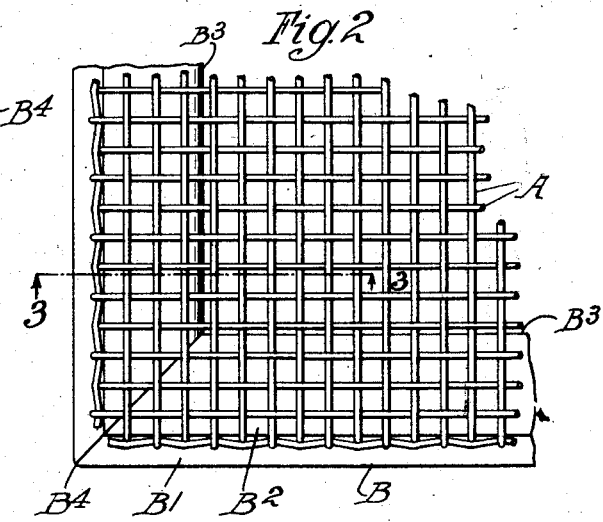
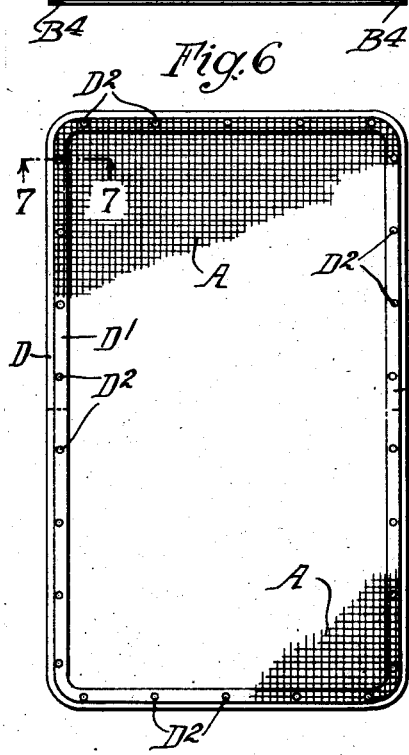
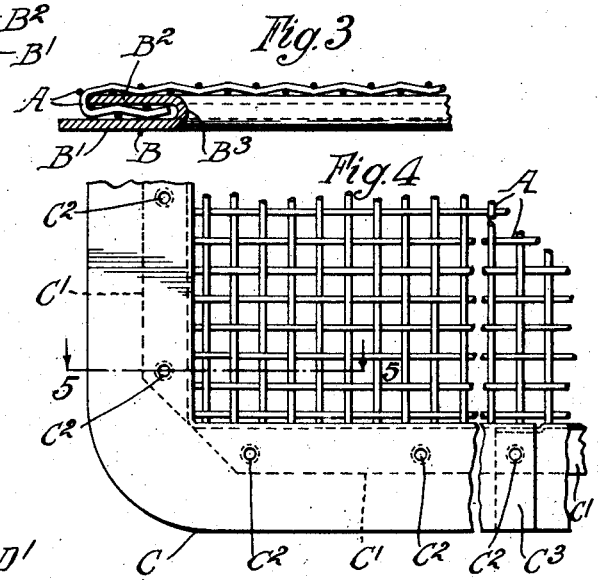
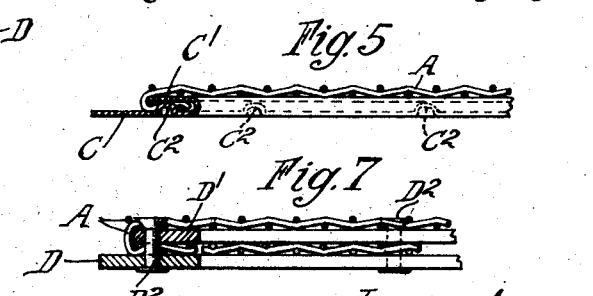
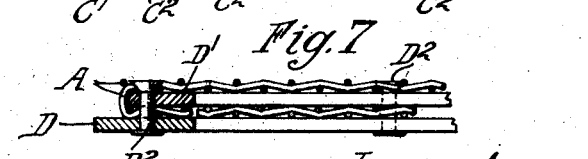
Inventor
Walter D. Baumann
by Parker & Carter
Attorneys Patented Aug. 12, 1930

1,772,699

UNITED STATES PATENT OFFICE

WALTER D. BAUMANN, OF CHICAGO, ILLINOIS, ASSIGNOR TO NILES STAMPING COMPANY, OF EVANSTON, ILLINOIS, A CORPORATION OF ILLINOIS

WIRE BAKING PAN

Application filed March 9, 1929. Serial No. 345,642.

My invention relates to an improvement in baking pans and has for particular purpose the provision of a baking pan having a pervious or wire mesh supporting surface. One object of my invention is to provide such a pan in which the edge of the mesh is protected by laterally extending guard means. Another object is the provision of such a pan in which the mesh engaging or supporting frame and the guard means are associated. Another object is the provision of a wire mesh baking pan which shall be easy to manufacture and which shall be of great strength. Another object is the provision of a 100% wire baking surface. Other objects will appear from time to time in the course of the specification and claims.

I illustrate my invention more or less diagrammatically in the accompanying drawings, wherein—

Figure 1 is a plan view;

Figure 2 is a detail of Figure 1 in enlarged plan view;

Figure 3 is a section on the line 3—3 of Figure 2;

Figure 4 is a bottom view of a modified form;

Figure 5 is a section on the line 5—5 of Figure 4;

Figure 6 is a plan view of a further modification; and

Figure 7 is an enlarged section along the line 7—7 of Figure 6.

Like parts are indicated by like symbols throughout the specification and drawings.

Referring first to the form of Figures 1 to 3, A generally indicates any suitable work supporting surface or member, herein shown as of wire mesh.

B generally indicates a circumferential frame member in the form of a flattened channel iron which includes the lower flange $B^1$, the upper, shorter flange $B^2$, and the connecting bend $B^3$. The frame members B may be joined at the corners as at $B^4$ by any suitable means. For example they may be welded. It will be clear from Figure 3 that the edges of the wire mesh A are bent under the flange $B^2$ and penetrate between the flanges $B^1$ and $B^2$. Pressure may be applied to press the flanges $B^1$ and $B^2$ together. When the frame members B are assembled with the edge of the mesh bent under the flange $B^2$, and the frame members have been secured together, the result is a stout, sturdy pan with a wire mesh surface unbroken from edge to edge. The edge of the pan, and specifically the edge of the mesh, is protected from battering or lateral engagement with adjacent parts by the outer projection of the flange $B^1$. This flange, as shown in Figure 3 extends outwardly or laterally not only beyond the edge of the upper flange $B^2$, but beyond the edge of the wire mesh.

Referring to Figures 4 and 5 I illustrate a variant form of my device in which a sheet metal frame element is employed which I indicate generally as C. Bent from the sheet metal body are the interior flanges $C^1$ which may be bent into the position in which they are shown in Figure 5 and in which they are shown in dotted line in Figure 4. The mesh penetrates the space between the flanges $C^1$ and the body C, as shown in Figure 5. In order to secure the edge of the mesh I would punch or upset the body C as at $C^2$, the mesh being thus locked in the space between the flanges.

In the form of pan of this type in which the frame is stamped or bent out of sheet stock I may form the frame of four parts, jointed intermediate the corners as at $C^3$ in Figure 4. In such case the pan frame will consist of four corner members, which may be welded or riveted at their intersections, the intersections being intermediate the corners.

Referring to the form of Figures 6 and 7 I illustrate a pan in which the upper and lower members of the frame are separate but riveted together. Thus I indicate a lower strip D, an upper strip D¹ and connecting members or rivets D². The mesh A is bent about the outer edge of the frame member D¹ into the space between the strips D and D¹ and the rivets lock the entire assemblies together.

It will be realized that whereas I have described and shown a practical and operative device, and several variations thereof, nevertheless I do not wish to be limited specifically to any particular form or application of my device. I therefore wish my description and drawings to be taken as in a broad sense illustrative and diagrammatic rather than as limiting me to my specific showing.

The use and operation of my invention are as follows:

In the employment of wire mesh baking pans, for example for biscuits, it is extremely important that the entire area of the pan be utilized. If, in a pan of this type, the edge of the mesh is clamped down by a frame member or a clamping element which projects inwardly from the edge of the pan, the space occupied by such member or element is lost. Furthermore, in the use of such pans, for example in the baking and handling of biscuits, if the pan is conveyed beneath a mechanism for depositing batter in which the batter is deposited at a number of points, some of the batter is likely to be deposited on the securing means or clamping edge of the frame. Such batter, if deposited on the frame or edge, must be scraped off by the man at the machine, or else will result in the baking of unsalable material. The result is an extra expense of labor, or a loss in waste, or a loss in time or in labor cost, and a reduction in output. I obtain a maximum output at minimum expense and with minium wastage by providing a wire mesh pan in which the mesh is available from edge to edge, the free surface of the wire mesh extending throughout the entire effective width of the pan, except for the very slight necessary projection of the guard flange.

While the employment of a free and unrestricted batter receiving surface of maximum area is important, it is also important that the edge of the mesh be protected. This is particularly the case because trays of this type pass through conveying machinery and baking machinery. Also they are subject to rough usage and heavy handling. The employees pitch them about, in practice, with a carelessness which is likely to be destructive of any but well built pans. The projecting edge or flange B¹ or the outward projection of the member C or D serve to provide lateral protection and to prevent the battering or wear of the mesh against the sides of conveying machinery or ovens. This is vitally important because the bent edge of the mesh is particularly vulnerable and subject to wear. The individual wires, if battered, become bent or broken and the pan as a whole becomes shortly unusable.

With my pan I provide a baking surface or batter supporting surface which is one hundred per cent usable. The wire mesh edge extends practically to the very edge of the pan. When the pans go through batter depositing machines the dies which are used to deposit batter can deliver batter only to the level supporting surface adapted to receive it. There is an elimination of loss in waste and time. The edge of the mesh is protected and the life of the pan is lengthened.

I claim:

1. As a new article of manufacture, a baking pan which includes a wire mesh baking surface, a frame element about the edge of said mesh, the wire mesh baking surface extending over said frame to the effective edge of the pan, the upper surface of said wire mesh baking member being free throughout the area of the pan, and a laterally extending guard for the edge of said wire mesh baking surface member.

2. As a new article of manufacture, a baking pan which includes a wire mesh baking surface, a frame element about the edge of said mesh, the wire mesh baking surface extending over said frame to the effective edge of the pan, the upper surface of said wire mesh baking member being free throughout the area of the pan, and a laterally extending guard for the edge of said wire mesh baking surface member, said guard member forming part of the said frame element.

3. As a new article of manufacture, a baking pan which includes a circumferential frame member having an upper flange and a lower flange, the lower flange extending outwardly beyond the edge of the upper, and a wire mesh baking surface member the edge of which penetrates between the two flanges, the body of which rests upon the upper flange and is bent downwardly about the edge of the upper flange.

4. As a new article of manufacture, a baking pan which includes a circumferential frame member having an upper element and a lower element, the lower element extending outwardly beyond the edge of the upper, and a wire mesh baking surface member, the edge of which penetrates between the two elements but is contained within the periphery of the lower element, the upper surface of said wire mesh baking member being free throughout the effective upper area of the mesh.

5. As a new article of manufacture, a baking pan which includes a wire mesh baking surface member, the outer edge of said wire mesh baking surface member being inwardly recurved, a circumferential frame member in operative contact with said inwardly recurved portion and a laterally extending guard for the edge of said wire mesh baking surface member, the upper surface of the wire mesh member being free throughout the effective upper area.

6. As a new article of manufacture, a baking pan which includes a wire mesh baking surface, a frame element about the edge of said mesh, the wire mesh baking surface extending over said frame to the effective edge of the pan, the upper surface of said wire mesh baking member being free throughout the area of the pan.

Signed at Chicago, county of Cook and State of Illinois, this 2nd day of March, 1929.

WALTER D. BAUMANN.